C. R. MILLER.
CAKE STRIPPING MACHINE.
APPLICATION FILED SEPT. 1, 1914.
1,150,873.
Patented Aug. 24, 1915.
4 SHEETS—SHEET 2.
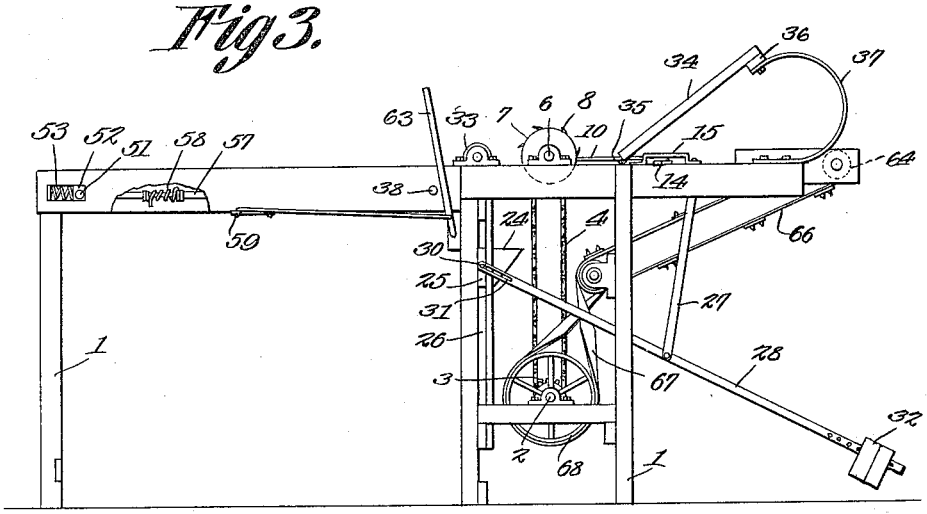
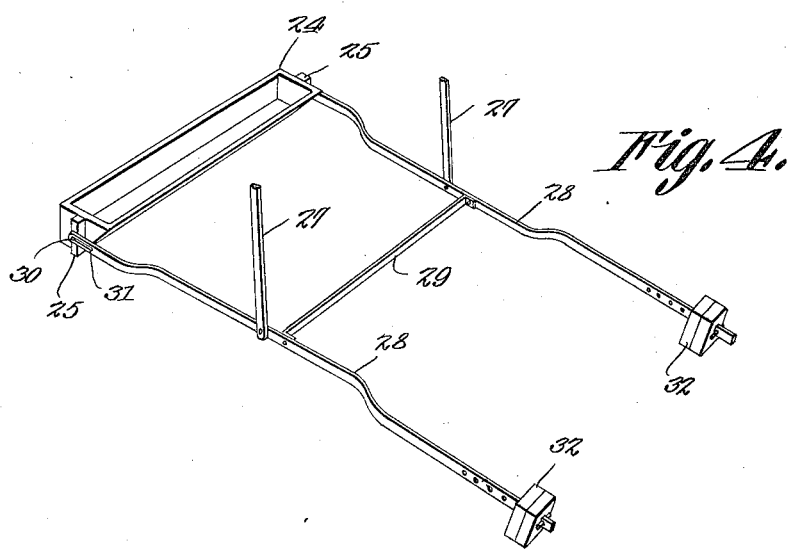
Charles R. Miller
Inventor,
by C. A. Snow & Co.
Attorneys.
Witnesses C. R. MILLER.
CAKE STRIPPING MACHINE.
APPLICATION FILED SEPT. 1, 1914.
1,150,873.
Patented Aug. 24, 1915.
4 SHEETS—SHEET 3.
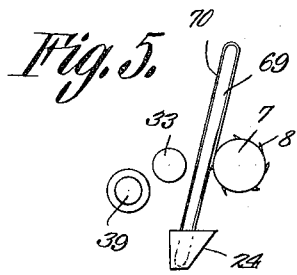
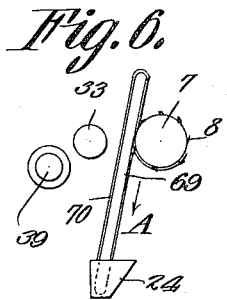
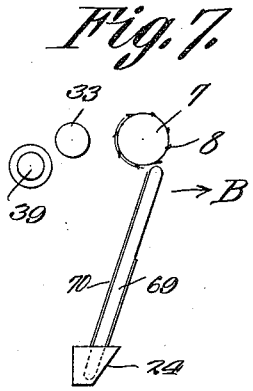
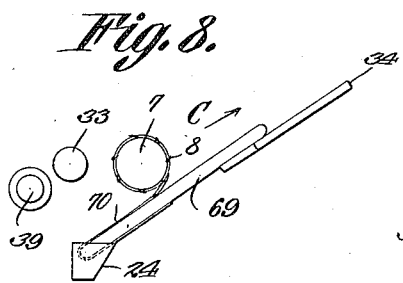
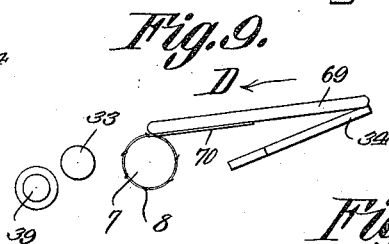
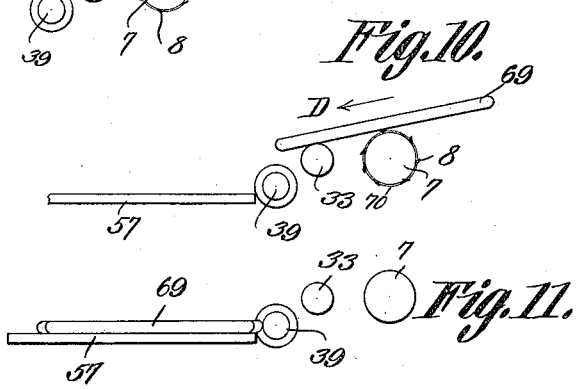
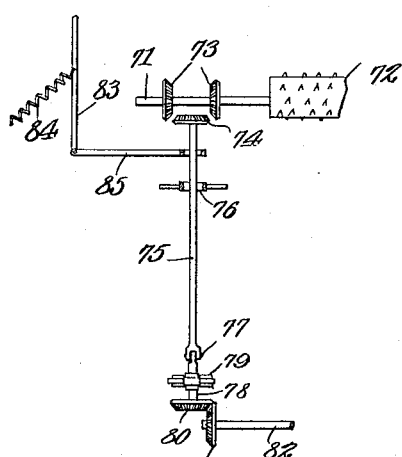
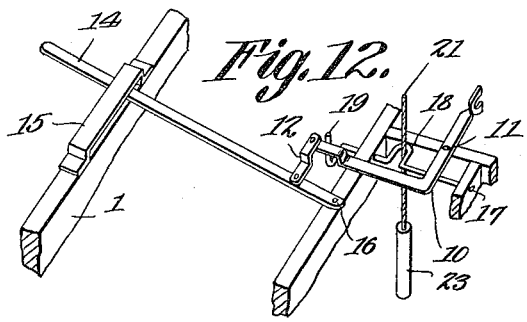
Charles R. Miller, Inventor,
Witnesses
by C. A. Snow & Co.
Attorneys.

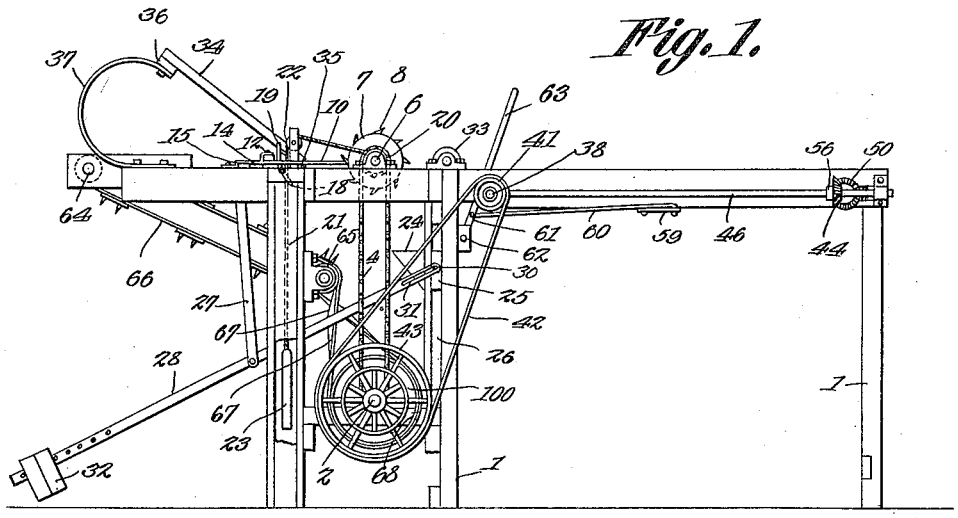

C. R. MILLER.
CAKE STRIPPING MACHINE.
APPLICATION FILED SEPT. 1, 1914.
1,150,873.
Patented Aug. 24, 1915.
4 SHEETS—SHEET 4.
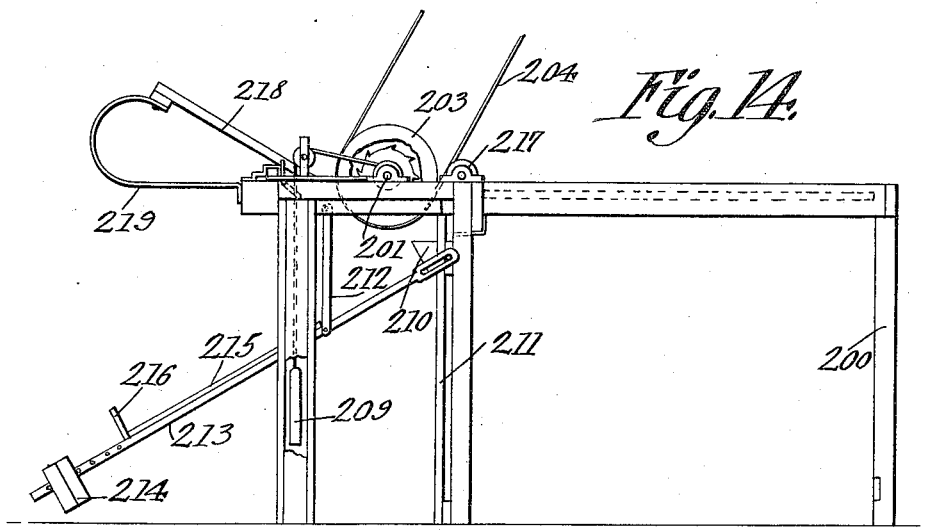
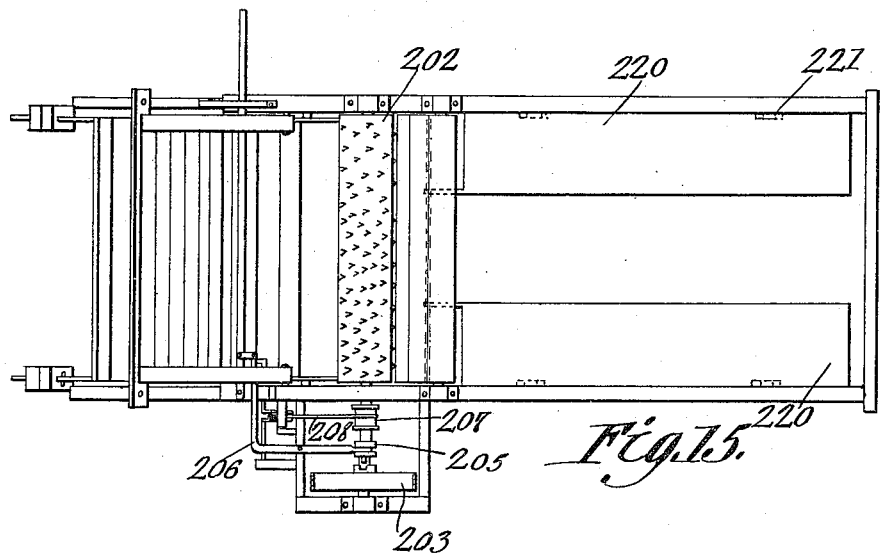
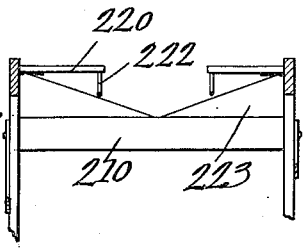
Witnesses
Charles R. Miller,
Inventor
by
Attorneys

UNITED STATES PATENT OFFICE.

CHARLES R. MILLER, OF WHITESBORO, TEXAS.

CAKE-STRIPPING MACHINE.

1,150,873.  Specification of Letters Patent.  Patented Aug. 24, 1915.

Application filed September 1, 1914. Serial No. 859,697.

*To all whom it may concern:*

Be it known that I, CHARLES R. MILLER, a citizen of the United States, residing at Whitesboro, in the county of Grayson and State of Texas, have invented a new and useful Cake-Stripping Machine, of which the following is a specification.

The device forming the subject matter of this application is adapted to be employed for stripping the press cloth from cakes of that type which form a by-product in oil mill operations.

One object of the present invention is to provide novel means for stripping cloth off the oil cake.

Another object of the invention is to provide novel means for conveying away the cloth after the same has been taken off the cake.

Another object of the invention is to provide means for trimming the cake after the cloth has been stripped off the cake.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings: Figure 1 shows in side elevation, a stripping and trimming machine constructed in accordance with the present invention; Fig. 2 is a top plan of the structure shown in Fig. 1; Fig. 3 is an elevation depicting the opposite side of the machine from that shown in Fig. 1; Fig. 4 is a perspective showing the cake trough and attendant mechanism; Figs. 5, 6, 7, 8, 9, 10 and 11 are diagrammatic views illustrating the travel of the cake through the machine while the cake is being stripped and trimmed; Fig. 12 is a perspective view delineating a portion of the mechanism whereby the stripping roller is reversed to permit an unwinding of the cloth; Fig. 13 is an elevation illustrating a slight modification in the means whereby the direction of rotation of the stripping roller may be reversed; Fig. 14 is a side elevation showing a modified form of the invention; Fig. 15 is a top plan of the structure delineated in Fig. 14; Fig. 16 is a fragmental transverse section showing the coöperation between the yieldable cake support and the platforms.

In carrying out the present invention there is provided a supporting structure in the form of a frame 1. The frame 1 may be variously constructed and still exercise its function as a means for carrying the movable elements whereby the stripping and trimming operations are effected.

Journaled for rotation in the lower portion of the supporting frame 1 is a drive shaft 2 carrying a sprocket 3 about which is trained a sprocket chain 4. The drive shaft 2 may be actuated by any suitable mechanism such as a pulley 100 and a belt 101. The sprocket chain 4 is trained around a sprocket wheel 5 journaled for rotation upon a shaft 6 rotatably mounted upon the upper portion of the frame 1. Fixed to the shaft 6 to rotate therewith is a stripping roller 7 provided with teeth 8. Splined upon the shaft 6 is a clutch 9 whereby the sprocket wheel 5 which is loose on the shaft 6 may be coupled up with the shaft 6. Noting particularly Fig. 12 it will be observed that an angular clutch lever 10 is fulcrumed as shown at 11 upon the frame 1 and by means of a link 12 one end of the lever 10 is connected with a hand lever 14 mounted to slide beneath a guide 15 on the frame 1 and fulcrumed at one end upon the frame 1 as shown at 16. Journaled in the frame 1 is a rock shaft 17 provided intermediate its ends with a loop-shaped crank 18 and equipped at one end with a finger 19 which is adapted to engage one end of the lever 10. Mounted upon the upper portion of the frame 1 as shown best in Fig. 1 is a pulley 22 about which is trained a flexible element 21. One end of the flexible element 21 is attached to a pulley 20 mounted on the shaft 6 and the other end of the flexible element 21 carries a weight 23.

The invention includes a cake support in the form of a trough 24 extended transversely of the machine. As shown in Fig. 4, the cake trough 24 is equipped at its ends with blocks 25 received in guides 26 in the machine frame 1. The cake trough 24, therefore, is mounted for vertical movement.

Hangers 27 depend from the frame 1 and act as fulcrums for an auxiliary frame shown in Fig. 4, the auxiliary frame comprising levers 28 connected by a cross rod 29. Pivot elements 30 are mounted in the guide blocks 25 of the cake trough 24 and these pivot elements are adapted to move in slots 31 formed in the levers 28 longitudinally thereof. Weights 32 are adjustably mounted upon the ends of the levers 28. It will now be obvious upon comparing Figs. 4 and 1 that the levers and the weights 32 serve to maintain the cake trough 24 in an uplifted position.

Extended transversely of the frame 1 and journaled thereon is a cake-guiding roller 33. Disposed upon the opposite side of the stripping roller 7 from the guiding roller 33 and hinged at 35 to the frame 1 is an inclined chute 34, resting upon a cross bar 36 yieldably supported upon the free upper ends of spring arms 37, the lower extremities of which are secured to the frame 1.

Extended transversely of the frame 1 and journaled therein is a shaft 38 carrying a trimming roller 39 which tapers in diameter from its ends toward its central portion, as shown in Fig. 2. The trimming roller 39 is provided with a plurality of teeth 40. These teeth 40 are disposed in oppositely wound spiral lines about the trimming roller 39. The shaft 38 carries a pulley 41 about which is trained a belt 42 passed about a pulley 43 on the shaft 2.

Secured to the shaft 38 is a beveled pinion 44 meshing into a beveled pinion 45 secured to one end of a shaft 46 extended longitudinally of the frame 1 and journaled in bearings 47 on the frame 1. Splined as indicated at 48 upon the shaft 46 is a beveled pinion 49 meshing into a beveled pinion 50 secured to a shaft 51 journaled in bearings 52 mounted to slide in the frame 1 (see Fig. 3), the bearings 52 being thrust toward the shaft 38 by means of springs 53. The shaft 51 carries a roller 54 provided with teeth 55, the roller 54 and its teeth 55 being formed after the manner of the trimming roller 39 hereinbefore described in detail. In order to maintain the beveled pinions 49 and 50 in mesh, a yoke 56 surrounds the shaft 51 and engages the beveled pinion 49, the shaft 46 being mounted to slide in the yoke.

A pair of cake supporting platforms 57 extend longitudinally of the frame 1. The platforms 57 are connected with the frame 1 for swinging movement, and are upheld by means of spring hinges 58 (see Fig. 3). These hinges 58 are strong enough to hold the platforms 57 in approximately horizontal positions when there is no cake upon the platforms, but when a cake rests upon the platforms, the latter are upheld by latches 59 fulcrumed intermediate their ends upon the frame 1 and united at their outer ends with connections 60 controlled by crank arms 61 formed upon the ends of a rock shaft 62 extended transversely of the machine and journaled in the frame 1, one crank arm on the rock shaft being elongated to form an operating handle 63.

Journaled in one end of the frame 1 and disposed transversely of the machine is a roller 64. A roller 65, disposed at a lower level than the roller 64 is journaled on the frame 1 near the central portion of the frame, as will be evident from Fig. 1. About the rollers 64 and 65 is trained an endless conveyer belt 66. The roller 65 is driven by a crossed belt 67 passed about a pulley 68 on the drive shaft 2.

The oil cake is shown at 69 and the press cloth around the oil cake is denoted by the numeral 70.

The operation of the device is as follows: One edge of the cake 69 is placed in the cake trough 24 and the free edge of the cloth 70 on the cake 69 is engaged with the teeth 8 on the stripping roller 7. The lever 14 is manipulated and through the medium of the link 12 the lever 10 is swung on the fulcrum 11, the lever 10 actuating the clutch 9 and coupling up the sprocket wheel 5 with the shaft 6. Now the stripping roller 7 is rotated by means of a gear train comprising the shaft 6, the sprocket wheel 5, the sprocket chain 4, the sprocket wheel 3 and the drive shaft 2. When the stripping roller 7 is rotated as above described, the cloth 70 on the cake 69 is wound up on the stripping roller. As the shaft 6 is rotated to actuate the stripping roller 7 and to wind up the cloth 70, the flexible element 21 is wound up on the pulley 20 of the shaft 6 and the weight 23 is elevated. Note Fig. 12. When the weight 23 has been elevated sufficiently, the weight strikes the crank 18 on the rock shaft 17 and rotates the latter, the finger 19 on the rock shaft engaging the lever 10 and serving to swing the lever. When the lever 10 is swung on its fulcrum 11 by the action of the finger 19, the clutch 9 is withdrawn from operative connection with the driving sprocket wheel 5 and the shaft 6 no longer is power driven from the drive shaft 2. Then, the elevated weight 23 pulls upon the flexible element 21 and through the instrumentality of the pulley 20 on the shaft 6 imparts a reverse rotation to the stripping roller 7. Thus, the cloth 70 which has been wound upon the stripping roller 7 is unwound therefrom and passes onto the endless conveyer 66 which is moving continuously, being driven by the crossed belt 67 and the pulley 68 on the drive shaft 2. By means of the conveyer 66, the cloth 70 which has been unwrapped from the cake 69 is carried out of the machine. During the time that the cloth 70 is being unwrapped from the cake 69, the cake travels in a peculiar path which will be understood best from Figs. 5 to 11 inclusive. When the lower edge of the cake 69 rests in the trough 24 and when the free edge of the cloth 70 is engaged with the teeth 8 on the roller 7, as shown in Fig. 5, and when the roller 7 is rotated as hereinbefore set forth, the cake 69 is first forced downwardly, as indicated by the arrow A in Fig. 6, the trough 24 being held yieldingly in contact with the lower edge of the cake by the action of the levers 28 and the weights 32. As the cloth 70 is wound about the roller 7, the upper edge of the cake moves laterally, as indicated by the arrow B in Fig. 7. Then the cake swings over onto the chute 34 and ascends the chute 34, as shown by the reference arrow C in Fig. 8. The springs 37 serve to support the chute 34 yieldingly and prevent a breaking of the cake during the operation above described. After the cake 69 has ascended the chute 34 as shown by the arrow C, the cake, as the cloth 70 is wound on the roller 7, ultimately starts to move in an opposite direction, as shown by the arrow D in Fig. 9, and passes on top of and across the roller 7. The cake 69, continuing to move as per arrow D as shown in Fig. 10, passes across the guiding roller 33 and onto the trimming roller 39. The trimming roller 39 advances the cake 69 until the cake rests upon the platform 57. Since the trimming roller 54 is thrust toward the trimming roller 39 through the action of the springs 53 shown in Fig. 3, the teeth 40 and 55 on the respective rollers will serve to trim off the ends of the cake, the ends of the cake generally being comparatively rich in oil. Since the teeth 55 and 40 on the respective rollers are disposed in oppositely wound spiral lines, the tendency of these teeth is to hold the cake in place on the platforms 57, and not to cause the cake to travel transversely of the machine and ride off the platforms, before the trimming operation has been completed.

The roller 39 is driven by a gear train comprising the following elements; the shaft 2, the pulley 43, the belt 42, the pulley 41 and the shaft 38. The roller 54 is driven from the shaft 38, by a gear train comprising the beveled pinion 44, the beveled pinion 45, the shaft 46, the beveled pinion 49, the beveled pinion 50 and the shaft 51. Owing to the fact that the beveled pinion 49 is splined as indicated at 48 to the shaft 46 and since the beveled pinions 49 and 50 are held in mesh by the yoke 56, it is obvious that the roller 54 may have the necessary movement due to the action of the springs 53, without losing its driving connection with the shaft 46. After the cake 69 has been trimmed sufficiently by the rollers 39 and 54, the rock shaft 62 is rotated through the medium of the handle 63, the connections 60 actuating upon the latches 59 and withdrawing the inner ends of the latches from beneath the platforms 57. Then the platforms 57 will swing downwardly under the weight of the superposed cake, and the cake will pass out of the machine, it thus being possible to pile up the cakes upon a truck (not shown) which may be placed beneath the platforms 57. When the cake is free from the platforms 57, the spring hinges 58 will swing the platforms 57 upwardly into approximate horizontal alinement as indicated in Fig. 2.

In Fig. 13 of the drawings I have shown a modified means for reversing the direction of rotation of the stripping roller, in order to unwind the cloth on the oil cake. In Fig. 13 there is shown a shaft 71 corresponding to the shaft 6, the shaft 71 carrying a stripping roller 72. Fixed to the shaft 71 are beveled pinions 73 adapted to mesh one at a time into a beveled pinion 74 secured to the upper end of a laterally swinging shaft 75 held for swinging movement in a frame supported bearing 76 and connected by means of a universal joint 77 with a shaft 78 rotatable but held against longitudinal movement in a frame supported bearing 79 and carrying at its lower end a beveled pinion 80 meshing into a beveled pinion 81 secured to a shaft 82 corresponding to the shaft 2. The shaft 75 is actuated by means of a link 85 and a lever 83, to bring the beveled pinion 74 into mesh with either one of the beveled pinions 73 at the will of the operator, a spring 84 being connected with the lever 83.

The simple structure delineated in Fig. 13 requires but a limited description so far as its operation is concerned, it being apparent to those skilled in the art that by moving the lever 83, the beveled pinion 74 may be brought into mesh with either of the beveled pinions 73, whereby the roller 72 may be rotated in one direction or in an opposite direction, from the drive shaft 82.

In Figs. 14, 15 and 16 of the drawing there is shown a simplified form of the invention in which the trimming mechanism is dispensed with. Many parts of the device under consideration are of identical construction with the corresponding parts in that form first described, and the description of the modification shown in Fig. 14 and following may be shortened accordingly. Referring to Figs. 14, 15 and 16, the frame or supporting structure is denoted by the reference character 200. The roller shaft is shown at 201 and the toothed stripping roller is shown at 202. The shaft 201 carries a loose pulley 203 which may receive a belt 204 to effect a rotation of the stripping roller. The pulley 203 is operatively connected with the shaft 201 through the medium of a clutch 205 controlled by a clutch shifting mechanism of the sort depicted in Fig. 12. A detailed description of the clutch shifting mechanism therefore, need not be gone into, the clutch shifting mechanism being designated generally in this form of the invention by the reference character 206. Fixed to the shaft 201 is a pulley 207 receiving a flexible element 208 carrying a weight 209, as before. The cake support or trough 210 is vertically movable in guides 211 on the frame. Hangers 212 depend from the frame and constitute fulcrums for levers 213 which are operatively connected with the ends of the trough or cake support 210 in the manner hereinbefore set forth, the ends of the levers 213 carrying adjustable weights 214. A deck 215 extends between the levers 213 and at the end of the deck 215 there is an upstanding stop 216. The cake guiding roller is shown at 217 and the hinged chute is designated by the reference character 218, the chute being supported on frame carried springs 219. The numeral 220 designates the cake receiving platforms which are hinged to the side portions of the frame as shown at 221. In this form of the invention, spring hinges are not employed. Projecting from the ends of the platforms 220 are fingers 222 adapted to coöperate with cam blocks 223, fixed to and upstanding from one edge of the trough or cake support 210.

The travel of the cake and the cloth through the machine remains as shown in Figs. 5, 6, 7, 8, 9, 10 and 11. When the cloth is stripped off the cake, the cloth is deposited on the deck 215, the stop 216 serving to prevent the cloth from sliding off the deck. The stripped cake passes onto the platforms 220 which are upheld by the fingers 222, the latter elements engaging the cam blocks 223 on the cake support 210. When the cake support 210 moves downwardly under the action of a cake which is to be stripped, the cake which has been previously stripped and now lies upon the platforms 220 is released from the platforms, since, when the cake support 210 moves downwardly, the cam blocks 223 on the cake support will no longer coact with the fingers 222 to hold the platforms 220 in horizontal positions. When the cake support 210 moves upwardly, the fingers 222 will traverse the inclined edges of the cam blocks 223 and position the platform 220 as shown in Fig. 16. It is to be noted that when the trough or cake support 210 moves downwardly, the platform 215, carrying the cloth, will be swung upwardly, bringing the cloth into easy reach of the operator, the cloth being pulled off the deck 215. Since the levers 213 and the deck 215 elevate the cloth, these parts act as a conveyer.

Having thus described the invention, what is claimed is:—

1. In a device for stripping a cloth from a cake, a cloth stripping means; a conveyer upon which the stripped cloth is deposited; and a trimming mechanism upon which the cake is deposited by the action of the stripping means upon the cloth.

2. In a device for stripping a cloth from a cake, a cloth stripping roller supported for rotation; means for rotating the roller to wind the cloth thereon; and a cake trimmer upon which the cake is deposited as the cloth is wound on the roller.

3. In a device for stripping a cloth from a cake, a stripping roller; means for rotating the roller in one direction to wind the cloth on the roller and to strip the cloth from the cake; means for reversing the direction of the roller to unwind the cloth therefrom; and a conveyer on which the cloth is deposited when unwound from the stripping roller.

4. In a device for stripping a cloth from a cake, a frame having guides; a cloth stripping roller journaled on the frame; a cake support movable in the guides and located below the roller; a lever fulcrumed intermediate its ends on the frame and loosely connected with the support, the lever being counterweighted adjacent one end to constitute means for elevating one end of the support; and a receiving means onto which the cake is advanced by the combined action of the cake stripping roller and the cake support.

5. In a device for stripping a cloth from a cake, a yieldably mounted cake support; a cloth stripping roller journaled for rotation adjacent the cake support; and a chute upon which the cake is adapted to travel during a portion of the time in which the stripping roller is acting upon the cloth.

6. In a device for stripping a cloth from a cake, a cake supporting chute; a cloth stripping roller journaled adjacent the chute and constituting means for depressing the cake and causing the cake to pass beneath the roller and onto the chute; and yieldable means for supporting the cake as the cake passes beneath the roller and onto the chute.

7. In a device for stripping a cloth from a cake, a cloth stripping roller mounted for rotation; means for reversing the direction for rotation of the roller; a yieldably mounted cake support located adjacent the roller; and a cake chute disposed adjacent the roller and adapted to receive the cake from the cake support.

8. In a device for stripping a cloth from a cake, a stripping roller; a primary driving means for rotating the stripping roller in one direction; a clutch operatively connecting the primary driving means with the roller; a secondary driving means operatively connected with the roller to rotate the roller in an opposite direction; and a device actuable by the secondary driving means and operatively connected with the clutch to disengage the primary driving means from the roller.

9. In a device for stripping a cloth from a cake, a stripping roller; a primary driving means for rotating the roller in one direction; a clutch operatively connecting the primary driving means with the roller; a power storing device operatively connected with the roller and rendered potential when the roller is rotated in said direction by the primary driving means; means operable by the power storing device and operatively connected with the clutch to disengage the primary driving means from the roller, thereby to render the power storing device kinetic to secure a reverse rotation of the roller.

10. In a machine for stripping a cloth from a cake, a stripping roller; means for rotating the roller in one direction; a clutch connecting said means with the roller; a retractile flexible element connected with the roller and adapted to be wound thereon when the roller is rotated in said direction; a shifting mechanism operatively connected with the clutch; and means under the control of the flexible element for actuating the shifting mechanism.

11. In a device for stripping a cloth from a cake, a frame; opposed cake receiving platforms hinged to the frame; means for releasably holding the platforms in approximately horizontal position; means for stripping the cloth from the cake; and means for depositing the cake upon the platforms.

In testimony that I claim the foregoing as my own, I have hereto affixed my signature in the presence of two witnesses.

CHARLES R. MILLER.

Witnesses:
J. W. OMOHUNDRO,
H. REAST.

Copies of this patent may be obtained for five cents each, by addressing the "Commissioner of Patents, Washington, D. C."